No. 728,076. PATENTED MAY 12, 1903.
A. BLONDEL.
GALVANOMETER.
APPLICATION FILED JAN. 3, 1901. RENEWED JAN. 10, 1903.
NO MODEL. 3 SHEETS—SHEET 1.
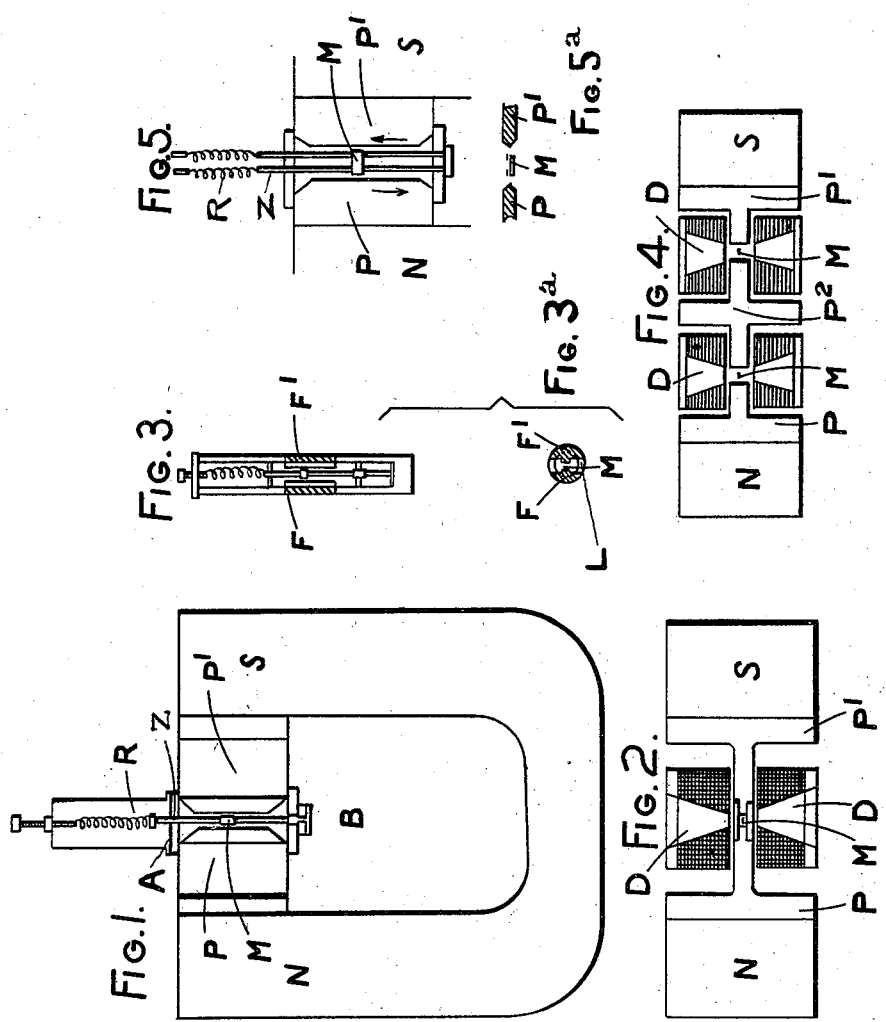

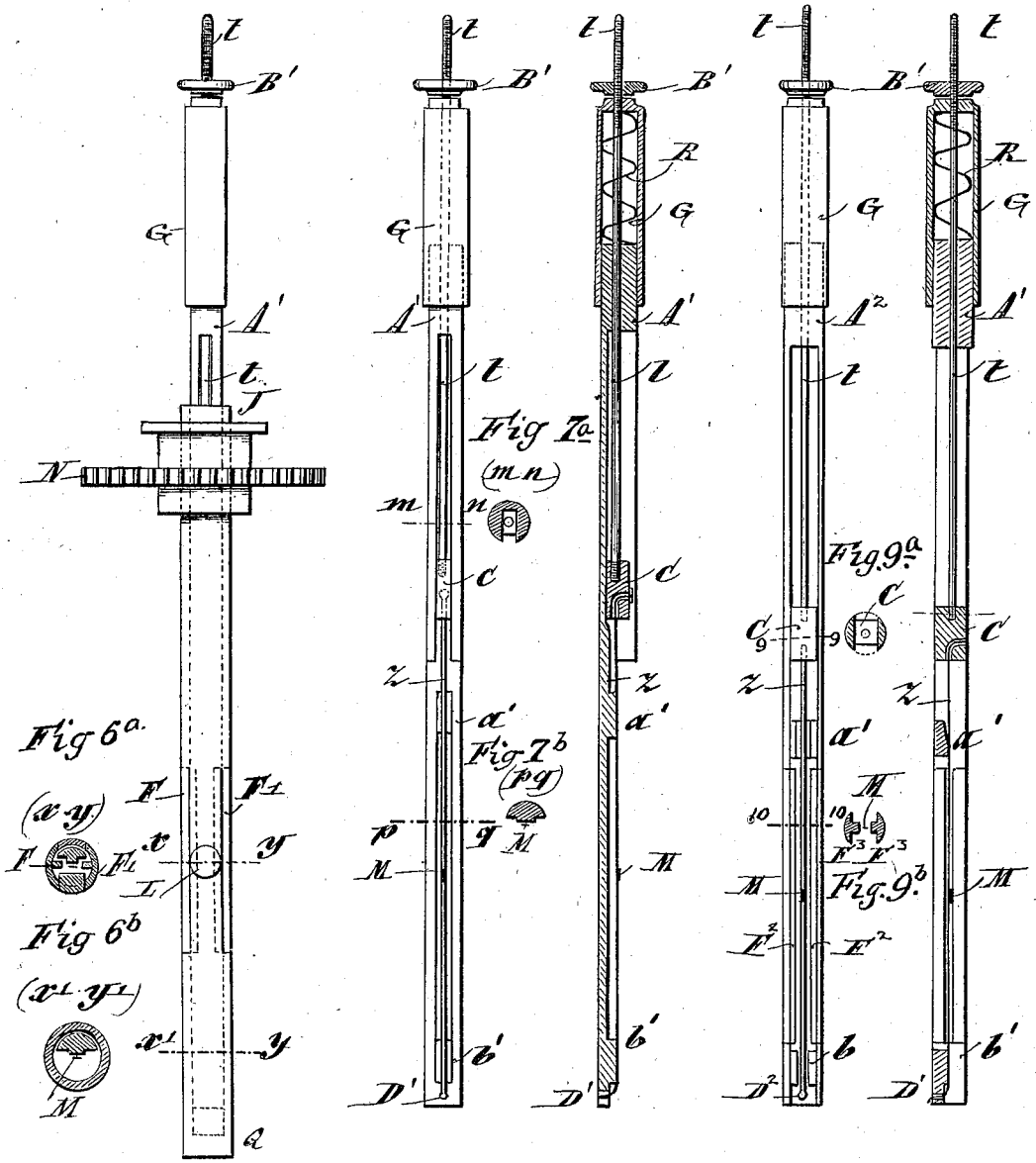

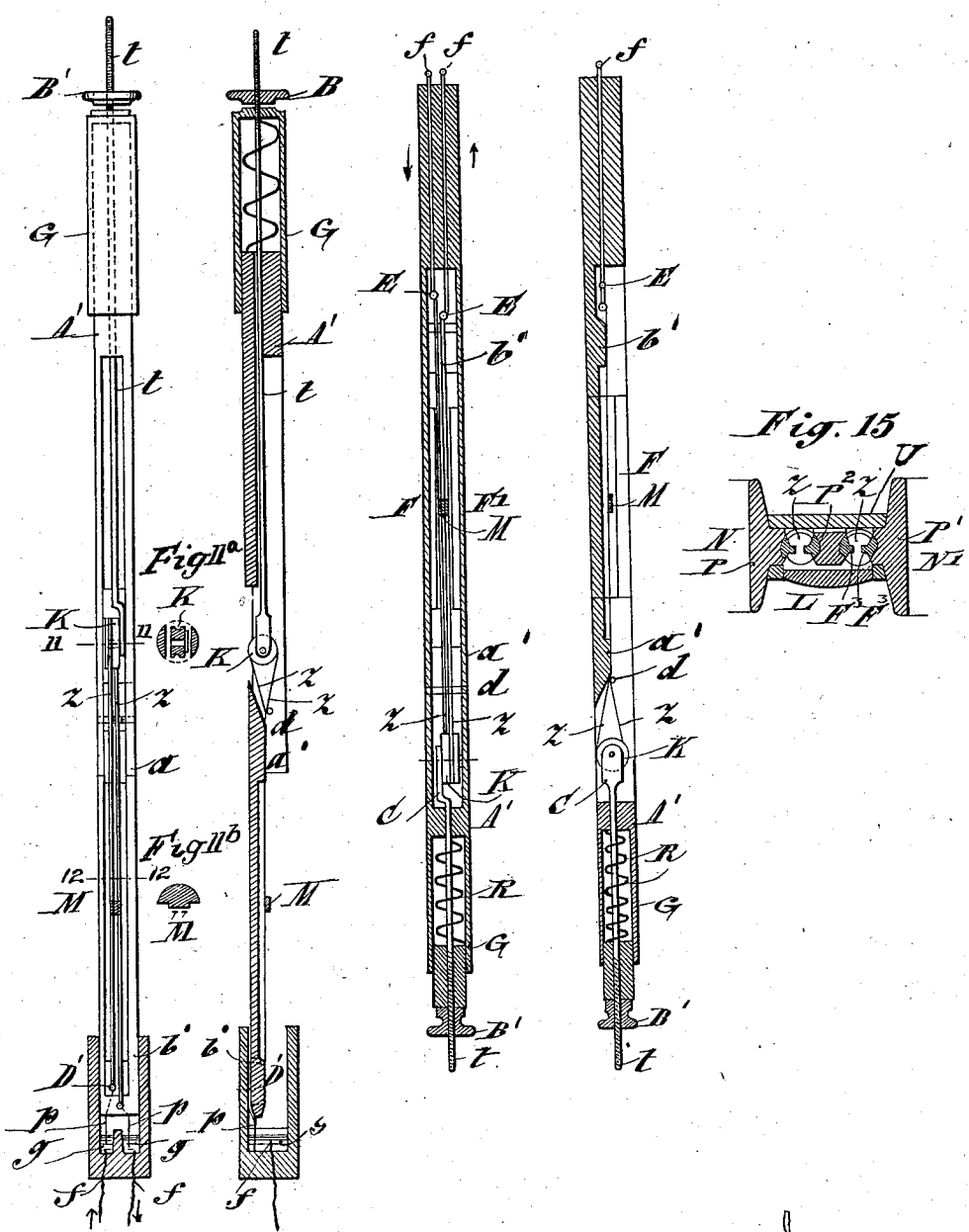

No. 728,076. Patented May 12, 1903.

UNITED STATES PATENT OFFICE.

ANDRÉ BLONDEL, OF PARIS, FRANCE.

GALVANOMETER.

SPECIFICATION forming part of Letters Patent No. 728,076, dated May 12, 1903.

Application filed January 3, 1901. Renewed January 10, 1903. Serial No. 138,522. (No model.)

*To all whom it may concern:*

Be it known that I, ANDRÉ BLONDEL, a citizen of the Republic of France, residing at Paris, France, have invented certain new and useful Improvements in or Relating to Galvanometers, (for which I have obtained Letters Patent in Belgium, under No. 150,323, dated June 6, 1900,) of which the following is a specification.

Whenever it is required to measure or indicate rapid variations in electrical energy, an apparatus is required capable of oscillating very quickly and delicately. I devised in the year 1893 two constructive forms of such galvanometers, the first consisting of a small soft-iron needle on which a mirror is secured and which is suspended by a thread or hung between two pivots in a very powerful magnetic field produced by a magnet or electromagnet. The current to be recorded is sent through one or more coils of metallic wire that produce a field perpendicular to the fixed field. The second system consists in placing in the powerful field instead of a small soft-iron needle two parallel wires brought very close together and traversed in opposite directions by the current, and in the middle of which wires a small mirror is secured across them. These systems are described in the *Comptes Rendus* for April, 1893. They are good, but do not permit of the use of a frequency of more than one thousand vibrations per second. The new construction about to be described is at the same time simpler and more perfect as regards the rapidity of oscillations and is more sensitive.

The invention essentially consists in the employment of very thin and very narrow bands of iron on which a mirror is secured, said bands being stretched on a support immersed in an oil-containing case.

In the accompanying drawings, Figure 1 is a side elevation with the deflecting-coils removed. Fig. 2 is a top plan view, the band and the coils being shown in section. Fig. 3 is an elevation of a separate oil-case for the band. Fig. $3^a$ is a cross-section of the same. Fig. 4 is a sectional plan view of two galvanometers in the same magnetic field. Fig. 5 is a side elevation of a portion of an apparatus like Fig. 1, but with two bands instead of one. Fig. $5^a$ is a cross-section through the mirror. Fig. 6 is a side elevation, on a large scale, of an oil-containing case for the bands. Figs. $6^a$ and $6^b$ are cross-sections of the same on lines $x\ y\ x'\ y'$, respectively. Fig. 7 is an elevation, and Fig. 8 a longitudinal section, of a holder for a single band. Figs. $7^a$ and $7^b$ are cross-sections on lines $m\ n\ p\ q$, respectively. Fig. 9 is an elevation, and Fig. 10 a longitudinal section, of a modified holder for a single band. Figs. $9^a$ and $9^b$ are cross-sections on the lines 9 9 and 10 10, Fig. 9. Fig. 11 is a sectional elevation, and Fig. 12 a longitudinal section, of a holder for two bands. Figs. $11^a$ and $11^b$ are cross-sections on the lines 11 11 and 12 12, respectively, Fig. 11. Figs. 13 and 14 are longitudinal sections, on perpendicular planes, of a modified holder for two bands. Fig. 15 is a horizontal section, on a large scale, of a modified oil-case and pole-pieces.

As shown in Fig. 1, a narrow band Z is stretched between two supports A B in the middle of two polar ends P P', arranged only a few millimeters apart and connected with the poles N S of a permanent magnet or electromagnet. A spring R tends to keep the band taut and to prevent it from coming in contact with one or the other of the two polar ends in spite of the narrowness of the air-gap. At the center of the band Z a very light and very small mirror M is secured, on which is directed a bundle of luminous rays issuing from a small hole or vertical slit in a screen lighted from behind. The luminous rays can be concentrated afterward, if desired, by means of a lens. The current to be recorded is sent through one or more coils D, arranged in front and at the rear of the polar ends, as shown in Fig. 2. (They are not shown in Fig. 1.) Under the action of the constant field of the permanent magnet or electromagnet the band becomes magnetized transversally over the whole height located in the field, and of course every horizontal element of the said band acts as a small magnet and has a tendency to be deviated by the influence of the field produced by the coils D. All these deviations act accumulatively from the ends of the band to the middle, and the mirror shows the total deviation. These deviations are approximately proportional with the current that passes through the coils.

The apparatus can thus be employed as a mirror-galvanometer. Its superiority over other forms of soft-iron needle-galvanometers is as follows:

First. The vibrations of the moving parts are extremely quick, owing to the fact that rotatory vibrations of a string around its own axis are far more rapid than its transverse vibrations. The tension applied by the spring R or by a weight suspended to the band increases this number of vibrations, in the same manner the effect of the fixed directing-field. I have found that the square of the number of proper vibrations is the sum of the squares of the numbers of vibrations respectively produced by the elasticity of torsion, by the magnetic field acting on the same band supposed to be suspended freely around its axis, and, lastly, by the transverse vibrations of the stretched band. Consequently, when employing very short, very narrow, and very thin bands with a very small and thin mirror the number of vibrations may range from ten thousand to fifty thousand complete periods per second, which could not be obtained by the galvanometers hitherto constructed.

Second. The deflecting influence of the coils extending to the whole band, the sensitiveness is also greater than when one employs only a small soft-iron needle on a non-magnetic wire or band.

To make the construction as well as the management of the apparatus easier, the vibrating band may be inclosed in a tube of insulating material placed between the polar ends P and P' and removable for inspection and repair. Figs. 3 and 3ª show this arrangement in elevation and section, in which to the tube are added two small pole-pieces of soft iron, F and F', which concentrate the field directly on the band. To effect damping, this tube is filled with a convenient oil—such as vaseline-oil, ricine-oil, &c. L is a little window closed by a glass piece or lens. In the arrangement in Fig. 1 one can also apply oil around the band by inclosing the pole-pieces at the rear and front by glass plates or other insulating substances conveniently connected or fixed, as shown in Fig. 2.

To avoid Foucault currents in the pole-pieces, they can be made of laminated sheet-iron.

I can arrange in one and the same magnet several galvanometers of this kind of which the air-gaps are in a same magnetic circuit. Fig. 4, for instance, represents a double galvanometer having two separate pairs of coils D, separated by one intermediate pole-piece $P^2$, the form of which in plan or cross-section is a cross. The two bands are magnetized by the same magnet, but are respectively submitted to the influence of one pair of coils alone, owing to the screening effect produced by the intermediate piece $P^2$.

Fig. 5 shows an apparatus similar to that of Fig. 1, but with two parallel bands Z Z instead of one, said bands being traversed by opposite electric currents, as indicated by the arrows, and held taut by two springs R.

Fig. 6 shows a removable and interchangeable oil-tube J Q, made of ivory or other suitable material, with a lens or window L in front and polar ends F F' in the sides. The case is also provided with a toothed or metal disk N for rotating it on its axis. A small removable holder A' is provided, on which the band Z is mounted and drawn taut by a spring contained in a tube G above. This holder is shown projecting above the end of the oil-case in which it is placed.

Figs. 7 to 14, inclusive, show examples of various forms of removable and interchangeable supporting frames or holders for bands to be introduced into the oil-cases shown in Figs. 6 and 15 or the like. In these figures the holder A' D' is made of any suitable material, either metallic or non-metallic, according to the requirements, and is provided with two sharply-cut protuberances $a'$ $b'$, on which are stretched the band or bands Z. One end of the band is fixed at D', while the other end in Figs. 7 to 10 is attached to a movable block C, provided with a stem $t$, passing up through the upper end of the holder A' D' and provided with a tubular cap G, telescoping upon the upper end of said holder. A helical spring R surrounds the stem between the upper end of the cap and the end of the holder. The stem projects up through said cap and is screw-threaded and provided with a nut B', by means of which the tension of the spring R can be adjusted at will. A mirror M is secured by glue, solder, or otherwise to the band Z. Figs. 7 to 10 relate to single-strip holders and Figs. 11 to 14 to double-strip holders. In Figs. 9 and 10 the lower part of the holder comprises a U-shaped magnet $F^2$, having inwardly projecting ribs $F^3$ for magnetizing the band.

In Figs. 11 to 14 the double bands are kept taut by means of an equalizing-pulley K, attached to the end of the adjustable stem $t$. Means are provided for conducting an electric current to and away from said bands. In Figs. 11 and 12 this comprises mercury-cups $g$, bored in the insulating-bottom of the oil-case, the bands having small pins $p$, dipping into the mercury-cups, to which the current is conducted through wires $f$, embedded in the insulating-bottom of the oil-case. In Figs. 13 and 14 the adjusting-spring and equalizing-pulley are at the lower end of the bands, whose upper ends are connected with wires or pins $f$, serving as terminals.

Fig. 15 shows two holders of the types illustrated in the preceding figures arranged side by side in an oil-case composed of two polar pieces P P', a brass or non-magnetic plate U, and a front glass or lens L. $P^2$ is an intermediate polar tip, and concentration-pieces $F^3$ $F^3$ are attached to this tip and to the polar pieces P P', as shown.

In the holder of Figs. 9 and 10 (shown in section in Fig. 9ᵇ) two concentration-pieces F³ F³ are provided in order to dispense with those of the case shown in Fig. 6.

The large magnet and pole-pieces, of laminated iron, can be dispensed with by employing a small horseshoe-magnet A² D² of tubular shape outside, Figs. 9 and 10, in the axis of which is stretched the band and which is afterward put in the oil-case. This magnet is sufficient to magnetize the band. A band of steel transversally magnetized by a prior presence in the field of a powerful magnet can be even employed without the use of any magnet, the only thing necessary being to place sheets of iron as magnetic screens between the adjacent pairs of coils of the double or triple galvanometer.

When two or more holders are placed in the same magnetic field, they can be suitably adjusted up or down and angularly in order to cause the rays reflected from the several mirrors to fall upon the same spot upon the screen. The same apparatus may be employed otherwise, as shown by Fig. 5, by suppressing the coils D and substituting for each band B two metallic bands stretched parallel and very close together, traversed by the current in opposite directions. In such case also the use of soft-iron bands may add the following advantages: First, the sensitiveness is increased in a certain degree owing to the concentration of the magnetic field, of which the lines of force instead of spreading in the air-gap are concentrated by the presence of the soft-iron bands, so that these bands, traversed by a given current, become submitted to a stronger mechanical torque; second, the number of vibrations is increased by the effect of the supplementary couple produced by the effect of the magnetic field acting on the bands magnetized transversally. The result is that with an equal sensitiveness the soft-iron bands present a quicker vibration than a bifilar galvanometer made of bronze bands or that for an equal number of vibrations they have a greater sensitiveness.

Bifilar galvanometers of this construction may also be placed either directly between the pole-pieces or in oil-cases with polar ends similar to those described above; but as there are no coils outside the pole-pieces may be made of heavy iron, and there is no necessity to give the shape of a cross to the intermediate piece.

The two metallic bands of my bifilar galvanometer are generally stretched and mounted on a long holder A' D' of insulating material, Figs. 11 and 12, or on a metallic piece by means of insulating-clamps, and a mirror M is secured across them afterward. An equalizing-pulley K can be added on the holder, which is drawn taut by a helical spring R. The holder is introduced into the oil-case, similar to that of Fig. 6, from above and can be moved up or down in order to place the mirror at the proper height. By turning the holders the luminous spots of the various galvanometers can be brought together on the same point of the observation-screen.

What I claim as my invention, and desire to secure by Letters Patent, is—

1. A reflecting-galvanometer, having means for producing a fixed field, one or more coils traversed by the current to be measured and producing a variable field perpendicular to the fixed field, and a band of thin, narrow magnetic material stretched in the fixed field which magnetizes it in the direction of its greater breadth, said band carrying a mirror at a point near its middle.

2. A galvanometer having a magnet producing a fixed field, one or more coils producing a variable field, a removable oil-filled case, placed between the poles of the magnet, a thin, narrow band of magnetic material in said case, a window in one wall of said case, and a mirror fastened to the band opposite said window.

3. In a galvanometer of the kind described provided with a band of magnetic material, of an oil-case containing the band, and furnished with a glass window through which the mirror can be seen, the said case being furnished with small polar ends.

4. In a galvanometer, means for producing a fixed field, and means for producing a field varying with the current to be measured, a case rotatable in the said fields, a holder in said case, a band of magnetic material stretched in said case, and a mirror attached to said band.

5. In a galvanometer, an oil-containing case, and a holder in said case consisting of a rigid bar, a band of magnetic material secured to the bar at one end, a movable member to which the band is secured, a screw-threaded rod attached to said movable member, a spring exerting a constant tension on said rod, and a mirror on said band.

6. In a galvanometer, a casing, a holder fitting therein, a doubled band of magnetic material secured to said holder, a pulley engaging the bight of said band, means for exerting a spring tension on the pulley, and terminals for conducting an electric current to and from said band.

In testimony whereof I have signed this specification in the presence of two subscribing witnesses.

ANDRÉ BLONDEL.

Witnesses:
EDWARD P. MACLEAN,
HIPPOLYTE BLONDEL.